United States Patent
Disser et al.

(10) Patent No.: US 6,580,991 B2
(45) Date of Patent: Jun. 17, 2003

(54) ELECTRIC CALIPER HARDWARE TOPOLOGIES FOR A SAFETY SYSTEM

(75) Inventors: Robert John Disser, Dayton, OH (US); Patrick Allen Mescher, Bellbrook, OH (US); Robert Allan Perisho, Jr., Russiaville, IN (US); Joseph Gerard D'Ambrosio, Clarkston, MI (US); Brian Thomas Murray, Novi, MI (US); Scott Alan Millsap, Saginaw, MI (US); Sanket Suresh Amberkar, Saginaw, MI (US); Jeff Allan Foust, Eaton, OH (US); Jeffrey A. Heinrichs, Dayton, OH (US); Michael Byers, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/737,295

(22) Filed: Dec. 14, 2000

(65) Prior Publication Data

US 2001/0032042 A1 Oct. 18, 2001

Related U.S. Application Data

(60) Provisional application No. 60/170,989, filed on Dec. 15, 1999.

(51) Int. Cl.[7] .......................... B60R 22/00; B62D 11/24
(52) U.S. Cl. ........................................ 701/48; 180/6.44
(58) Field of Search ................... 701/36, 48, 41–43, 701/60–62, 69, 78, 83–84, 99, 107; 180/6.2, 6.44, 6.48, 6.5, 233–234, 244–246, 271, 33–334, 408–413; 303/9, 9.63, 121–122, 122.08, 42; 700/21, 19, 20, 82, 108–110, 170, 177, 286–292; 376/215–216

(56) References Cited

U.S. PATENT DOCUMENTS 3,845,991 A    11/1974   Engle ............................ 303/3
4,263,979 A    4/1981    Sturgill ...................... 180/79.1
5,086,870 A *  2/1992    Bolduc ........................ 180/333
5,170,352 A    12/1992   McTamaney et al. .. 364/424.02
5,309,361 A    5/1994    Drott et al. .............. 364/424.1
5,325,935 A    7/1994    Hirooka et al. ............. 180/211
5,456,332 A    10/1995   Borenstein .................. 180/167
5,473,233 A    12/1995   Stull et al. .................. 318/587
5,621,291 A    4/1997    Lee ....................... 318/568.16
5,752,748 A *  5/1998    Schramm et al. ............. 303/20
5,777,218 A    7/1998    Salamat et al. ............... 73/121
5,828,972 A    10/1998   Asanuma et al. .............. 701/41
5,984,504 A *  11/1999   Doyle et al. ................. 700/108
6,047,222 A *  4/2000    Burns et al. .................. 700/79
6,067,782 A *  5/2000    Dickhans ................. 56/10.2 A
6,158,822 A    12/2000   Shirai et al. .................... 303/3
6,285,936 B1 * 9/2001    Bohner et al. ................. 701/41

FOREIGN PATENT DOCUMENTS

EP           0834671 A    4/1998    .......... F16D/65/34

* cited by examiner

Primary Examiner—Thu Nguyen
(74) Attorney, Agent, or Firm—Scott A. McBain

(57) ABSTRACT

A safety redundant drive by wire system includes a plurality of first control members to which control signals may be communicated and a plurality of device controllers adapted to deliver control signals to a respective first control member. Each device controller includes a first microprocessor for communicating control signals to the first control member and all other device controllers. Each device controller further includes a second microprocessor for redundantly communicating control signals to all other device controllers and for communicating with the first microprocessor. The system includes a dual redundant communication channel system having a first communication channel controlled by the first microprocessor of each device controller and a second communication channel controlled by the second microprocessor of each device controller.

8 Claims, 5 Drawing Sheets

ELECTRIC CALIPER HARDWARE TOPOLOGIES FOR A SAFETY SYSTEM

This application claims the benefit of U.S. Provisional Patent Application Ser. No. 60/170,989, filed Dec. 15, 1999.

BACKGROUND OF THE INVENTION

1. Field of the Invention

The subject invention relates to a system for controlling brake motors or steering motors on a vehicle. More particularly, this invention relates to a system for redundantly controlling brake motors and steering motors on a vehicle having a brake by wire or drive by wire system.

2. Description of the Prior Art

Brake by wire and drive by wire systems are known in the prior art whereby one can control the steering and braking functions of a vehicle using a control device, such as a steering wheel and brake pedal or joystick. Typically, these systems have more than one communication channel for communicating signals from the control device to the steering and braking motors such that, when that communication channel experiences an error, the entire system is not inoperable.

Control systems with redundant communications networks are typically accomplished using two different families of device controllers, wherein each family of device controllers operates independently on two separate networks. These redundant systems require a significant amount of hardware, which are difficult and expensive to package in a vehicle with a drive by wire or brake by wire system.

It is desirable to provide redundancy in a brake by wire or drive by wire system.

SUMMARY OF THE INVENTION AND ADVANTAGES

The invention provides a safety redundant drive by wire system comprising a plurality of brake motors disposed in corners of a vehicle to which control signals may be communicated. A plurality of sensors are disposed in the system, such that at least one sensor is coupled to the brake motor for sensing a parameter of the brake motor and responsively generating a sensor signal. A device controller is disposed in the corners of the vehicle and adapted to deliver control signals to a respective brake motor. Each of the device controllers includes a first and second microprocessor for communicating control signals to the brake motor associated with that device controller, all other device controllers and each other. Each device controller is adapted to receive the sensor signal and provide it to the first and second microprocessors.

The control signals are communicated over a dual redundant communication channel system having a first communication channel for communicating control signals from one device controller to all other device controllers, and a second communication channel for redundantly communicating control signals between device controllers. The first and second microprocessors control the first and second communication channels, respectively.

A plurality of hardware configurations which may be used independently or together in some combination to achieve redundant drive by wire and brake by wire systems. Accordingly, the first and second microprocessors on a device controller control the first and second communication channels, respectively, providing a redundant drive by wire and brake by wire system with minimal hardware.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
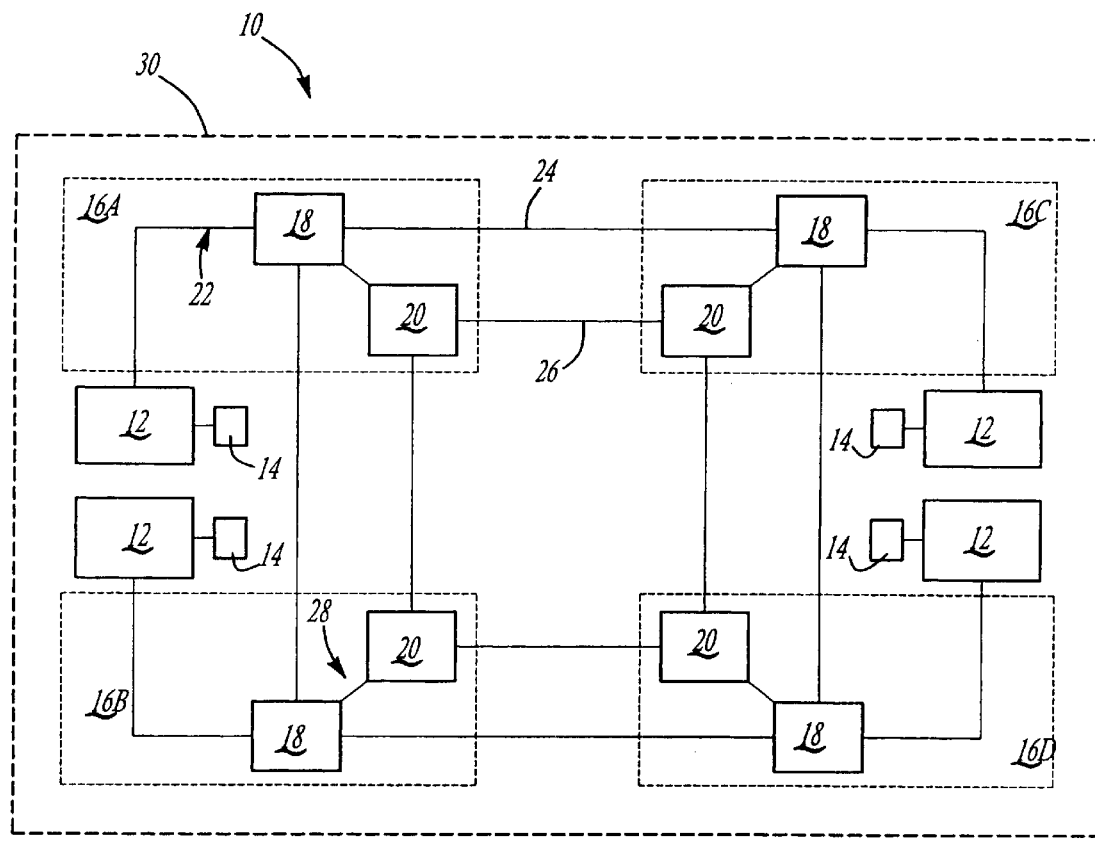
FIG. 1 is a block diagram of a system configuration wherein the first microprocessor of each device controller controls a first control member and the second microprocessor of each device controller provides redundant communications.
Figure 2:
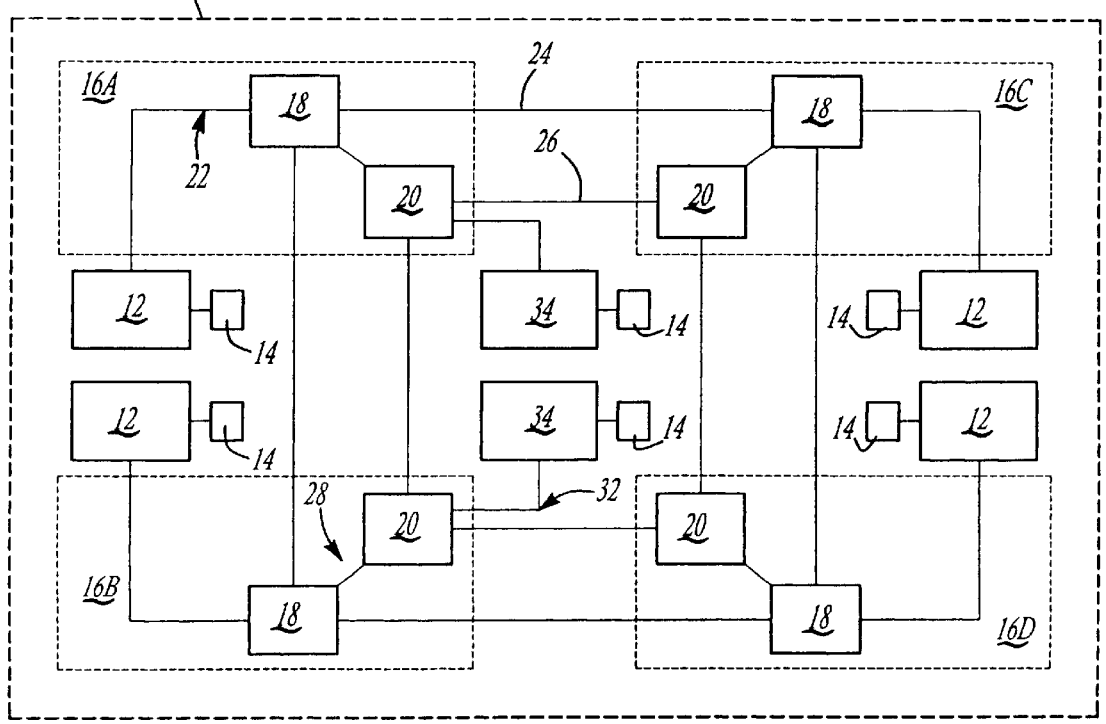
FIG. 2 is a block diagram of a system configuration wherein the first microprocessor of each device controller controls a first control member and provides redundant communications, and the second microprocessor of each device controller controls a second control member and provides redundant communications.
Figure 3:
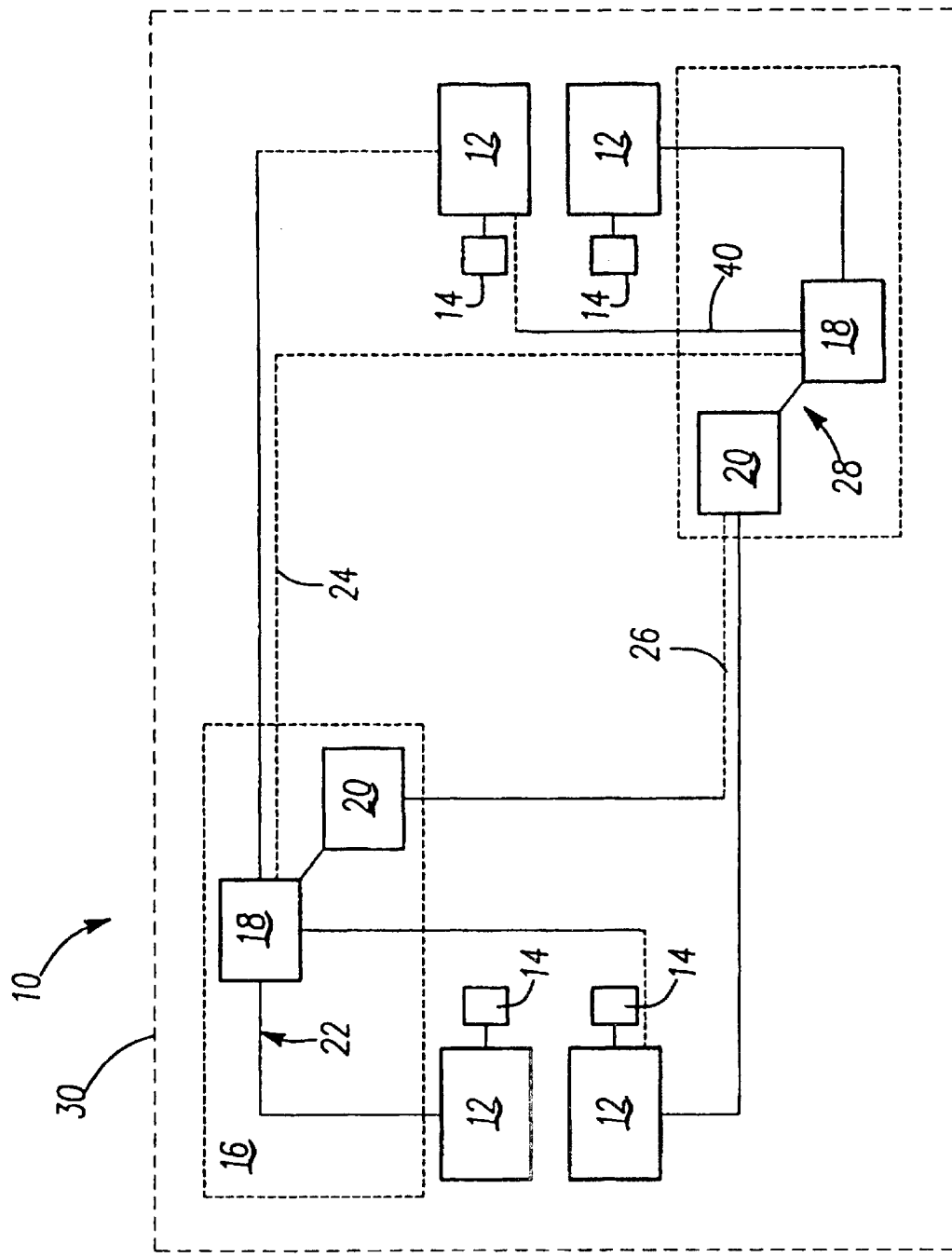
FIG. 3 is a block diagram of a system configuration wherein the first microprocessor of two different device controllers control a first control member, and the second microprocessor of each device controller provides redundant communications.

Referring to FIGS. 1 through 3, wherein like numerals indicate like or corresponding parts throughout the several views, a safety redundant drive by wire system is generally shown at 10. In a first embodiment, a plurality of first control members 12, such as brake motors, to which control signals may be communicated, are disposed in a vehicle 30, one at each wheel. A plurality of sensors 14 are disposed within the vehicle 30, wherein at least one of the sensors 14 is coupled to each of the first control members 12 for sensing a parameter of the first control member 12 and responsively generating a sensor signal. A plurality of device controllers 16, are disposed in the vehicle 30, one at each wheel and paired with a brake motor 12, wherein each device controller 16 is adapted to deliver control signals to its respective first control member 12.

Each device controller 16 includes a first microprocessor 18, for communicating control signals to the first control member 12, thus, providing functionality to the brake motor 12, and all other device controllers 16. Each device controller 16 further includes a second microprocessor 20 for redundantly communicating control signals to all other device controllers 16 and for communicating with the first microprocessor 18. Each device controller 16 is adapted to receive sensor signals and provide these sensor signals to the first and second microprocessors 18, 20. If a device controller 16 detects an error, the first microprocessor 18 discontinues controlling the control member 12 and the second microprocessor 20 communicates a default control signal to all other device controllers 16.

The system of the subject invention further includes a dual redundant communication channel system using a time deterministic protocol, such as the Time Triggered Protocol (TTP). The dual redundant communication channel has a first communication channel 24, for communicating control signals from one device controller 16 to all other device controllers 16, and a second communication channel 26, for redundantly communicating control signals from one device controller 16 to all other device controllers 16. The first microprocessor 18 of each device controller 16 controls the first communication channel 24, and the second microprocessor 20 of each device controller 16 controls the second communication channel 26. The first 18 and second 20 microprocessors are synchronized.

In one embodiment, the first microprocessor 18 and the second microprocessor 20 are not of identical type. For example, the first microprocessor 18 is an MPC555 microprocessor and the second microprocessor 20 is an HC12 microprocessor. Two different microprocessors ensure that identical code is not executed between the control microprocessors 18.

In the drive by wire or brake by wire systems of the present invention, the signal inputs are generated by a driver operated source such as steering wheel and brake pedal and/or a joystick. The device controllers 16 receive the signal input, generate control signals and communicate these control signals to the control members 12 associated with the particular device controller 16.

In a second embodiment of the subject invention, as shown in FIG. 3, two device controllers 16 are adapted to deliver different control signals to one first control member 12, more particularly, a dual wound motor disposed at each front wheel of a vehicle. Each device controller 16 operates independently, such that if one device controller 16 with associated control members 12 fails, the second device controller 16 can provide some limited control level. In this configuration, one front and one rear brake are controlled by the same device controller. This embodiment further includes a master microprocessor for controlling the braking functions for the dual wound motor controller and a brush motor controller, such that two or more microprocessors are present in the system to provide either redundant communications or redundant control, or both.

In a third embodiment, the system 10 of the first embodiment includes a second control member 34, such as a steering member, to which control signals are communicated by the second microprocessor 20 of an associated device controller 16. Each device controller 16 includes a first microprocessor 18, for communicating control signals to the first control member 12, thus, providing functionality to the brake motor 12 and all other device controllers 16. The first microprocessor 18 also redundantly communicates control signals from the second control member 34 to all other device controllers 16. Each device controller 16 further includes a second microprocessor 20 for communicating control signals to the second control member 34, thus, providing functionality to the steering motor, and all other device controllers 16. The second microprocessor 20 also redundantly communicates control signals to all other device controllers 16 and communicates with the first microprocessor 18. If a device controller 16 detects an error, the first microprocessor 18 discontinues controlling the first control member 12, while still providing redundant communications for the second communication channel 26. The second microprocessor 20 communicates a default control signal for the first control member 12 to all other device controllers 16 while still communicating control signals to the second control member 34.

In another embodiment, the first microprocessor 18 and the second microprocessor 20 are of identical type. For example, both the first microprocessor 18 and the second microprocessor 20 are MPC555 microprocessors. While two identical microprocessors allow propagation of software bugs, software development is simplified.

In yet another embodiment of the system 10, the first microprocessor 18 of one of the device controllers 16 communicates control signals to the second control member 34.

Figure 4:
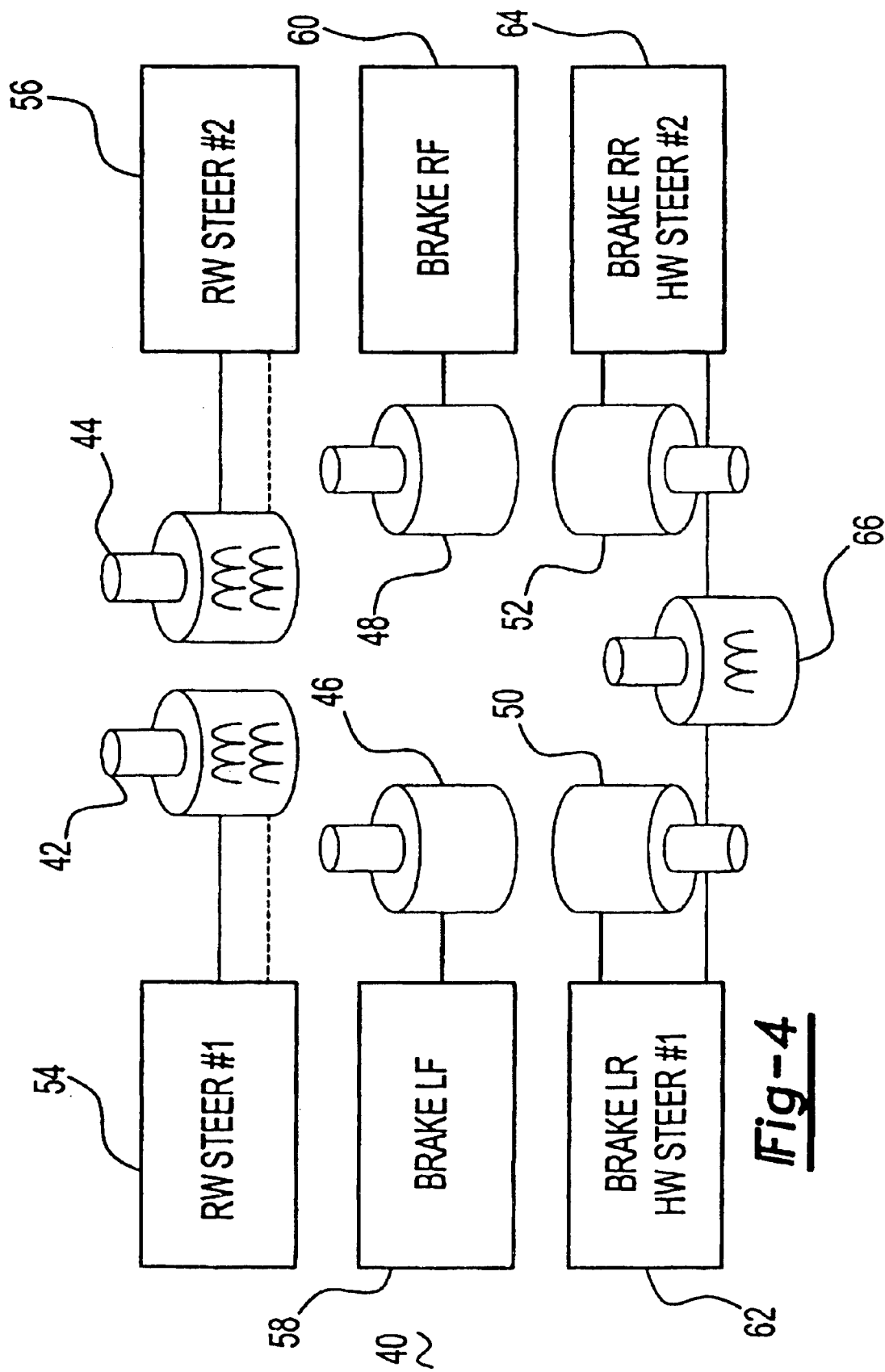
FIG. 4 is a block diagram of a system configuration of a braking and steering system, according to an embodiment of the present invention.

With reference to FIG. 4, the present invention is applied to a braking and steering system 40 having a first road wheel (RW) dual wound motor 42, a second road wheel dual wound motor 44, a left front (LF) brake motor 46, a right front (RE) brake motor 48, a left rear (LR) brake motor 50, and a right rear (RR) brake motor 52. The first and second RW dual wound motors 42, 44 for providing steering control to a vehicle (not shown).

A first RW steering dual microprocessor controller 54 controls actuation of the first RW dual wound motor 42. A second RW steering dual microprocessor controller 56 controls actuation of the second RW dual wound motor 44.

A LF brake dual microprocessor controller 58 controls actuation of the LF brake motor 46. A RF brake dual microprocessor controller 60 controls actuation of the RF brake motor 48. A LR brake dual microprocessor controller 62 controls actuation of the LR brake motor 50. A RR brake dual microprocessor controller 64 controls actuation of the RR brake motor 52. Preferably, the LR controller 62 and the RR controller 64 each control one of two hand wheel steering motors 66.

The dual microprocessor controllers 54,56,58,60,62,64 each have first and second microprocessors 18, 20, as described above. In one embodiment, the first and second microprocessors 18,20 of the first and second RW steering dual microprocessor controllers 54, 56 each control one half of the respective dual wound motor 42,44. Thus, if one the first and second microprocessors 18,20 fails or is taken off-line due to a fault then steering function exists through the other microprocessor 18,20.

Figure 5:
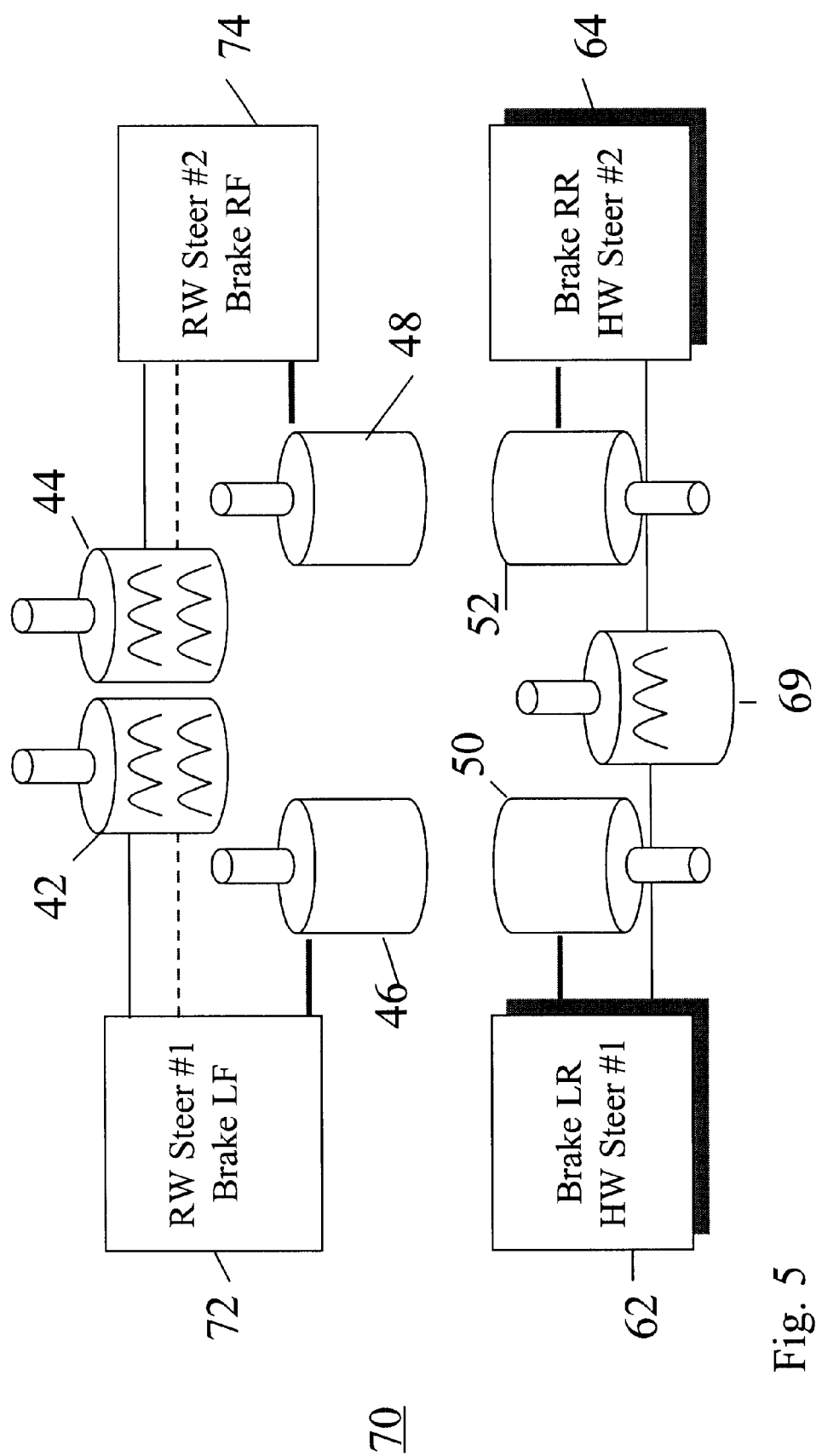
FIG. 5 is a block diagram of a system configuration of a braking and steering system, according to an other embodiment of the present invention; and, FIG. 6 is a block diagram of a system configuration having a main controller and first and second controllers, according to an embodiment of the present invention.

With reference to FIG. 5, an alternative embodiment 70 of the braking and steering system 40 is shown. In FIG. 5, like elements are numbered the same as in FIG. 4. The first RW steering dual microprocessor 54 and the LF brake dual microprocessor controller 58 are combined in a first brake and steer dual microprocessor controller 72. The second RW steering dual microprocessor 56 and the RF brake dual microprocessor controller 60 are combined in a second brake and steer dual microprocessor 74.

Figure 6:
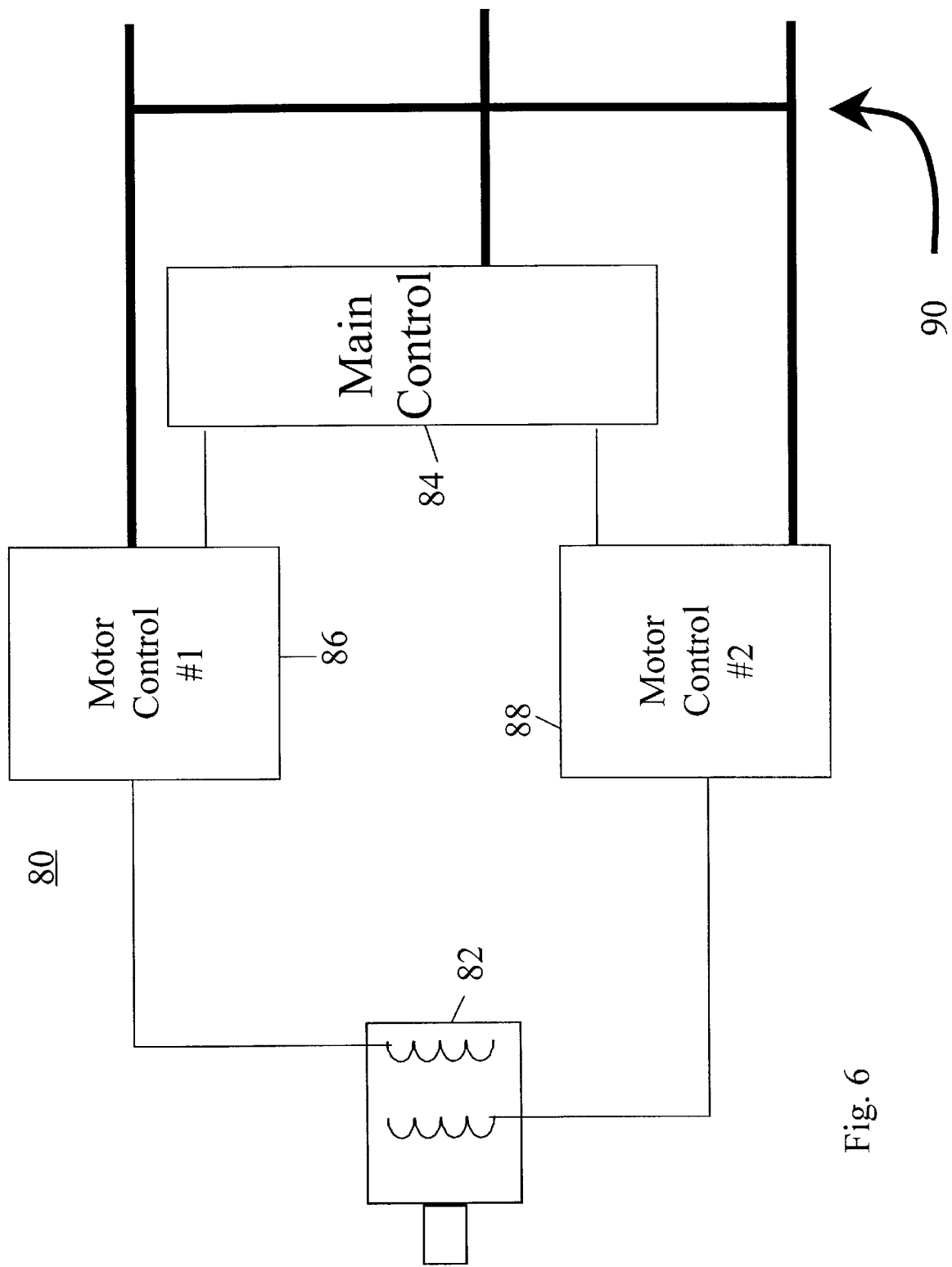

With reference to FIG. 6, a system 80 is illustrated where a dual wound motor 82 controls a single function, such as braking or steering. The system 80 includes a main controller 84, a first motor controller 86, and a second motor controller 88. The main controller 84, first motor controller 86 and the second motor controller 88 each include a single microprocessor 18, 20 which performs operational checks on the other controllers 84,86,88. Under normal operation, the main controller 84 provides control information to the first and second motor controllers 86,88. The first and second motor controllers 86,88 each control one half of the dual wound motor 82. The main controller 84,86,88 are coupled to a common bus 90 for sharing all inputs and outputs such that each controller 84,86,88 operates independently at a low power output.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty has utility. In addition, the reference numerals in the claims are merely for convenience and are not to be read in any way as limiting.

What is claimed is:

1. A drive by wire control system for a vehicle, the vehicle having at least one front wheel and one rear wheel, comprising:

a front brake motor coupled to the at least one front wheel, the front brake motor being actuated in response to receiving control signals;

a front brake controller coupled to the front brake motor for generating and delivering the control signals to front brake motor;

a rear brake motor coupled to the at least one rear wheel, the rear brake motor being actuated in response to receiving control signals;

a rear brake controller coupled to the rear brake motor for generating and delivering the control signals to the rear brake motor;

a steering motor coupled to one of the front wheel and the rear wheel for providing steering of the one of the front wheel and the rear wheel;

a steering controller coupled to the steering motor, wherein the front brake controller, the rear brake controller, and the steering controller each include first and second microprocessors, one of the first and second microprocessors for providing control of the respective motor;

a first communication link coupled to and controlled by the first microprocessors of the front brake controller, the rear brake controller, and the steering controller; and, a second communication link coupled to and controlled by the second microprocessors of the front brake controller, the rear brake controller, and the steering controller, the first and second communication links providing redundant communication between the front brake controller, the rear brake controller, and the steering controller.

2. A control system, as set forth in claim 1, wherein the steering motor is a dual wound motor, the first microprocessor of the steering controller coupled to a first half of the dual wound motor and the second microprocessor of the steering controller coupled to a second half of the dual wound motor.

3. A control system, as set forth in claim 1, wherein the first and second microprocessors of the front brake controller, the rear brake controller, and the steering controller are synchronized.

4. A control system, as set forth in claim 1, wherein the first and second microprocessors of the front brake controller, the rear brake controller, and the steering controller are of identical type.

5. A control system, as set forth in claim 1, wherein the first and second microprocessors of the front brake controller, the rear brake controller, and the steering controller are of different type.

6. A control system, as set forth in claim 1, further comprising a driver operated source for generating an input signal.

7. A control system, as set forth in claim 6, wherein the input signal is a steering signal.

8. A control system, as set forth in claim 6, wherein the input signal is a braking signal.

* * * * *